United States Patent Office

3,268,412
Patented August 23, 1966

3,268,412
PROCESS FOR RUPTURING MICRO-ORGANISM CELLS GROWN ON HYDROCARBON FEEDSTOCK
Alfred Champagnat, Paris, and Bernard Maurice Laine, Lavera, France, assignors to The British Petroleum Company Limited, London, England, a British joint-stock corporation
No Drawing. Filed Dec. 16, 1963, Ser. No. 330,521
Claims priority, application France, Feb. 8, 1963, 924,254; Great Britain, May 24, 1963, 20,803/63, 20,804/63
25 Claims. (Cl. 195—3)

This invention relates to a process involving cell wall rupture of micro-organisms cultivated on a hydrocarbon feedstock.

According to one aspect of this invention there is provided a process which comprises cultivating a micro-organism in the presence of a feedstock consisting of or containing straight chain hydrocarbons; and thereafter subjecting a fraction containing said micro-organism to conditions such that a fraction consisting of or containing proteins or polyproteins or polypeptides or amino-acids contained in said micro-organism or derived therefrom is recovered.

Preferably the fraction containing the micro-organism is subjected to autolysis, plasmolysis or hydrolysis.

Autolysis may be brought about by means of the enzymes contained in the micro-organism or by the addition of other enzymes.

The cultivation of the micro-organisms, for example yeasts, on petroleum hydrocarbons gives cells which, after washing and drying, have a particularly sharp and rancid taste. These micro-organisms, particularly yeasts, have a high content of lipids, the presence of which is undesirable because of their easy oxidation which leads to a disagreeable taste and odour.

However, the dry micro-organism even when freed from lipids have an insufficient and irregular digestive utilisation rate. This disadvantage is at least in part due to the condition of drying the cells which is necessarily somewhat severe.

The process now described converts the micro-organism to a more digestible material.

Autolysis, which is the favoured method for breaking down the cells, leads to a product in the form of a liquid, the viscosity of which depends on the concentration of dry matter. The autolysate which contains proteins of a much lower molecular weight than the dry yeast is much more digestible. Since it has been obtained without severe heating, the unstable amino acids and the vitamins may be completely or substantially preserved.

Furthermore, the liquid form of the autolysate permits of an easy extraction of the lipids which it contains, using an appropriate solvent.

Thus the autolysate may be treated with a suitable solvent to extract from it the lipids and the traces of hydrocarbons which it may still contain. It is then preferably concentrated in vacuo at a temperature lower than 70° C. so as to preserve from destruction the desired constituents, for example, amino-acids and vitamins.

According to another aspect of this invention there is provided a process which comprises cultivating a micro-organism in the presence of a feedstock consisting of or containing straight chain hydrocarbons, separating the product into a fraction containing the micro-organism, a fraction containing aqueous nutrient medium and, if hydrocarbons are present in the product in substantial amount, a fraction containing said hydrocarbons; thereafter subjecting a fraction containing said micro-organism to a series of alternate washing stages and separation stages, in the first washing stage there being used an aqueous solution of a surface active agent and in the last washing stage there being used an aqueous medium which is free of surface active agents, the separation stages being operated to separate the micro-organism from an aqueous phase, the separated micro-organism then passing on for further treatment, the washing and separation stages being carried out in such manner that the micro-organism recovered from said series of stages has a hydrocarbon content less than 7% by wt. based on the weight of the dry micro-organism; thereafter subjecting the washed micro-organism to conditions such that rupture or extraction of the cells takes place.

Preferably proteins or polyproteins or polypeptides or amino-acids contained in said micro-organism or derived therefrom are separated from cell wall material consisting of cell walls and/or material which constituted the cell walls.

According to another aspect of this invention there is provided a process which comprises cultivating a micro-organism in the presence of a feedstock consisting of or containing straight chain hydrocarbons; preferably thereafter, if hydrocarbons are still present, separating a fraction containing the micro-organism from said hydrocarbons; and thereafter subjecting a fraction containing said micro-organism to conditions such that proteins or polyproteins or polypeptides or amino-acids contained in said micro-organism or derived therefrom are separated from cell wall material consisting of cell walls and/or material which constituted the cell walls, and thereafter treating said cell wall material which is contaminated with hydrocarbons, with or without a preliminary modifying treatment, by solvent extraction to recover at least part of the hydrocarbons from the cell wall material.

Usually the cell wall material, obtained after separation of proteins, polyproteins, polypeptides and/or amino-acids, contains glucides, lipids and some further proteins as well as the hydrocarbons which are to be removed. In the solvent extraction stage the lipids will usually be removed from the cell wall material. Thus with the cell wall material there will usually be left the glucosides and some proteins.

Preferably solvent extraction of the cell wall material is carried out by the use of a solvent consisting of or containing a hydrocarbon. Preferably the hydrocarbon has 4–7 carbon atoms per molecule. Preferably the hydrocarbon is a paraffin and preferably, the paraffin is a straight chain paraffin. Normal pentane and normal hexane are suitable solvents.

If desired the extraction of the cell wall material by means of a hydrocarbon solvent is preceded by extraction by means of an alcohol, preferably ethanol.

If desired there may be used an extraction stage using, as solvent, a mixture of a hydrocarbon, for example, as hereinbefore described together with an alcohol, for example ethanol. Thus there may be used a solvent consisting of 80% by wt. of hexane and 20% by wt. of ethanol.

The hydrocarbons recovered in the extract phase by solvent extraction, if metabolisable, may be recycled to the micro-organism cultivation stage.

The solid phase obtained by solvent extraction consisting of the purified cell wall material may contain of the order of 4% by wt. of fixed nitrogen and is a valuable cattle foodstuff.

The preferred manner of cultivation and subsequent treatment of the micro-organism will now be described in further detail.

Preferably the feedstock is a straight chain hydrocarbon or a mixture of hydrocarbons containing a straight chain hydrocarbon. Preferably the hydrocarbon is $C_{10}$ or higher. Suitably there may be used a hydrocarbon fraction derived from petroleum.

It is well-known that certain petroleum fractions particularly gas oils, contain straight chain hydrocarbons, mainly paraffins which are waxes and which have an adverse effect upon the pour point of the fraction; that is to say, when these hydrocarbons are removed, wholly or in part, the pour point of the fraction is lowered. Usually the wax is removed by precipitation by means of solvents, the wax originally present in the fraction being recovered as such, that is, without conversion to more valuable products.

The petroleum fractions boiling below the gas oils, for example, heavy naphthenes and kerosines also contain straight chain hydrocarbons which are potentially valuable for conversion to other products but hitherto, in general, utilization of these hydrocarbons has been rendered difficult by the necessity of recovering these hydrocarbons from the petroleum fractions, in which they are contained, before they can be converted to other products.

According to a preferred feature of this invention there is provided a process which comprises cultivating a micro-organism in the manner as hereinbefore described in the presence of a petroleum fraction consisting in part of straight chain hydrocarbons and having a mean molecular weight corresponding to at least 10 carbon atoms per molecule, and in the presence of an aqueous nutrient medium; and in the presence of a gas containing free oxygen and separating from the mixture, on the one hand, the micro-organism and, on the other hand, a petroleum fraction having a reduced proportion of straight chain hydrocarbons or which is free of said straight chain hydrocarbons.

The process of the invention is of particular value for the treatment of petroleum gas oil fractions which contain straight chain hydrocarbons in the form of waxes, since by the process of the invention, a gas oil of improved pour point is obtained while the waxes are converted to a valuable product.

Usually the straight-chain hydrocarbons will be present in the feedstocks according to the invention as paraffins; however, the straight chain hydrocarbons may be present as olefins; also there may be used a mixture containing straight chain paraffins and olefins.

It is an important feature of this invention that when cultivating yeasts in the presence of the feedstocks hereinbefore described under conditions favouring the growth of the yeasts at the expense of the straight chain hydrocarbons, the other hydrocarbons, for example isoparaffins, naphthenes and aromatics are not metabolished or, at most, the proportion which is metabolised is very small. Furthermore, unlike conventional chemical processes governed by the law of mass action, the rate of removal of straight chain hydrocarbons is not substantially reduced as the proportion of these hydrocarbons in the overall mixture of hydrocarbons decreases (except, of course, in the very final stages of removal). Thus, when desired, the percentage conversion of straight chain hydrocarbons which is achieved can be maintained at a value approaching 100% without necessitating a very disproportionate expenditure of contact time to achieve small improvements. Furthermore, in the continuous process, this high percentage conversion can be achieved without resorting to the use of a long reaction path.

By the application of this process under conditions which limit the metabolisation of the straight chain hydrocarbons it is possible to operate with the removal of only a desired proportion of these hydrocarbons.

Suitable feedstocks to the process of the invention include kerosine, gas oils and lubricating oils; these feedstocks may be unrefined or may have undergone some refinery treatment, but will usually be required to contain a proportion of straight chain hydrocarbons in order to fulfill the purpose of this invention. Suitably the petroleum fraction will contain 3–45% by weight of straight chain hydrocarbons.

Micro-organisms which are cultivated as herein described may be yeasts, moulds or bacteria.

Preferably when a yeast is employed this is of the family Cryptococcaceae and particularly of the sub-family Cryptococcoideae; however, if desired there may be used, for example, ascosporogeneous yeasts of the sub-family Saccharomycoideae. Preferred genera of the Cryptococcoideae sub-family are Torulopsis (also known as Torula) and Candida. Preferred strains of yeast are as follows. In particular it is preferred to use the specific stock of indicated Baarn reference numbers; these reference numbers refer to stock held by the Centraal Bureau vor Schimmelculture, Baarn, Holland:

*Candida lipolytica*
*Candida pulcherrima*, CBS 610
*Candida utilis*
*Candida utilis*, variati *major*, CBS 841
*Candida tropicalis*, CBS 2317
*Torulopsis collisculosa*, CBS 133
*Hansenula anomala*, CBS 110
*Oidium lactis*
*Neurospora sitophila*

Of the above *Candida lipolytica* is particularly preferred. If desired, the micro-organism may be a mould. A suitable strain is *Penicillium expansum*.

If desired, the micro-organism may be bacterium. Suitably the bacteria are of one of the orders:

Pseudomonadales, Eubacteriales and Actinomycetals.

Preferably the bacteria which are employed are of the family Bacillaceae and Pseudomonadaceae. Preferred species are *Bacillus megaterium, Bacillus subtilis* and *Pseudomanas aeruginosa*. Other strains which may be employed include:

*Bacillus amylobacter*
*Pseudomonas natriegens*
Arthrobacter sp.
Micrococcus sp.
Corynebacterium sp.
*Pseudomonas syringae*
*Xanthomonas begoniae*
*Flavobacterium devorans*
Acetobacter sp.
Actinomyces sp.

Suitable moulds are of the family Aspergillaceae. A suitable genus is Pencillium.

Preferably there is used *Pencillium expansum*. Another suitable genus is Aspergillus.

Usually the cultivation is carried out in the presence of an aqueous nutrient medium. If desired, certain solid nutrient media may be employed.

In either case, a gas containing free oxygen must be provided.

*Pencillium expansum* is suitable for cultivation in an aqueous nutrient medium containing hydrocarbons.

*Pencillium roqueforti, Pencillium notatum, Aspergillus fussigatus* and *Aspergillus niger, Aspergillus versicolor* may be used for cultivation on a solid agent containing hydrocarbons as feedstock.

For the growth of the micro-organism it will be necessary to provide, in addition to the feedstock, an aqueous nutrient medium and a supply of oxygen, preferably in the form of air.

A typical nutrient medium for the growth of Nocardia, a genus in the Actinomycetales order, has the following composition:

| | Grams |
|---|---|
| Ammonium sulphate | 1 |
| Magnesium sulphate | 0.20 |
| Ferrous sulphate, 7H$_2$O | 0.005 |
| Manganese sulphate, 1H$_2$O | 0.002 |
| Monopotassium phosphate | 2 |
| Disodium phosphate | 3 |
| Calcium chloride | 0.1 |
| Sodium carbonate | 0.1 |
| Yeast extract | 0.008 |
| Distilled water (to make up to 1000 mls.). | |

For other bacteria a suitable nutrient medium has the composition:

| | |
|---|---|
| Monopotassium phosphate, grams | 7 |
| Magnesium sulphate, 7H$_2$O, gram | 0.2 |
| Sodium chloride, gram | 0.1 |
| Ammonium chloride, grams | 2.5 |
| Tap water (trace elements), mls. | 100 |
| Yeast extract, gram | 0.025 |
| Made up to 1000 mls. with distilled water. | |

A suitable nutrient medium for yeasts (and moulds) has the composition:

| | Grams |
|---|---|
| Diammonium phosphate | 2 |
| Potassium chloride | 1.15 |
| Magnesium sulphate, 7H$_2$O | 0.65 |
| Zinc sulphate | 0.17 |
| Manganese sulphate, 1H$_2$O | 0.045 |
| Ferrous sulphate, 7H$_2$O | 0.068 |
| Tap water | 200 |
| Yeast extract | 0.025 |
| Distilled water (to make up to 1000 mls.). | |

Micro-organisms, and in particular yeasts, when first cultivated with the use of hydrocarbon fractions as feedstock sometimes grow with difficulty and it is sometimes necessary to use an inoculum of a micro-organism which has previously been adapted for growth on the hydrocarbon fraction which it is intended to use. Furthermore the micro-organism although cultivated in the presence of an aqueous mineral medium containing the appropriate nutrient elements may grow with difficulty, because the hydrocarbon fraction does not contain the growth factors which exist in carbohydrate feedstocks, unless these growth factors are added.

The growth of the micro-organism used is favoured by the addition to the culture medium of a very small proportion of extract of yeast (an industrial product rich in vitamins of group B obtained by the hydrolysis of a yeast) or more generally of vitamins of group B and/or biotin. This quantity is preferably of the order of 25 parts per million with reference to the aqueous fermentation medium. It can be higher or lower according to the conditions chosen for the growth.

The growth of the micro-organism takes place at the expense of the feedstock fraction with the intermediate production of bodies having an acid function, principally fatty acids, in such manner that the pH of the aqueous mineral medium progressively diminishes. If one does not correct it the growth is fairly rapidly arrested and the concentration of the micro-organism in the medium, that is cellular density, no longer increases so that there is reached a so-called stationary phase.

Preferably therefore the aqueous nutrient medium is maintained at a desired pH by the step-wise or continuous addition of an aqueous medium of high pH value. Usually, when using moulds or yeasts and in particular when using *Candida lipolytica,* the pH of the nutrient medium will be maintained in the range 3–6 and preferably in the range 4–5. (Bacteria require a higher pH, usually 6.5–8.) Suitable alkaline materials for addition to the growth mixture include sodium hydroxide, potassium hydroxide, disodium hydrogen phosphate and ammonia, either free or in aqueous solution.

The optimum temperature of the growth mixture will vary according to the type of micro-organism employed and will usually lie in the range 25–35° C. When using *Candida lipolytica* the preferred temperature range is 28–32° C.

The take-up of oxygen is essential for the growth of the micro-organism. The oxygen will usually be provided as air. In order to maintain a rapid rate of growth the air, used to provide oxygen, should be present in the form of fine bubbles under the action of stirring. The air may be introduced through a sintered surface. However there may be used the system of intimate aeration known as "vortex aeration."

It has been found that by the use of yeast of the strain *Candida lipolytica* in a process according to the invention in which aeration is effected by "vortex aeration," a high growth rate is achieved whereby the generation time lies in the range 2–5 hours and the cell concentration is increased by a factor of up to 12 in two days.

In batch operation, the micro-organism will usually grow initially at a low rate of increase in cellular density. (This period of growth is referred to as the "lag phase.") Subsequently the rate of growth will increase to a higher rate of growth; the period at the higher rate of growth is referred to as the "exponential phase" and subsequently again the cellular density will become constant (the "stationary phase").

A supply of the micro-organism for starting the next batch will preferably be removed before the termination of the exponential phase.

The growth operation will usually be discontinued before the stationary phase.

At this stage, the micro-organism will usually be separated from the bulk of the aqueous nutrient medium and from the bulk of the unused feedstock fraction.

If desired the micro-organism may be subjected to autolysis before further purification of the product.

According to one method of treating the product the major part of the continuous aqueous phase is first separated; preferably this is carried out by centrifuging or decanting. The separated aqueous phase will usually contain a greater concentration of non-nutritive ions than can be tolerated in the recycle stream and when this is so, only a proportion of the recovered aqueous phase can be recycled. Thus it will usually be possible to separate ca. 96% by wt. of the aqueous phase which is present in the product, of which on the same percentage basis, ca. 20% by wt. will be discarded. The recycle stream is supplied with make-up quantities of the necessary nutrients and is returned to the fermenter; if desired the make-up materials may be fed to the fermenter as a separate steam.

The process, as applied to the cultivation of a yeast, may incorporate product separation stages as follows. In some cases micro-organisms other than yeasts may be separated in this manner.

By centrifuging the product from the fermenter three fractions are recovered. These are in order of increasing density:

(i) An oil phase containing yeast cells, (ii) An aqueous phase containing traces of oil and yeast, and (iii) A yeast "cream" consisting of yeast, having a quantity of oil fixed on to the cells, together with aqueous phase.

After recovery of fraction (ii), fraction (iii) or a blend of fractions (i) and (iii) is mixed with an aqueous solution of a surfactant.

The purpose of this treatment is to separate the oil from the yeast cells; the oil being apparently held to the cells by adsorption.

Preferably the micro-organism fraction is vigorously mixed with the aqueous surface active agent and, without a further period of growth of the micro-organism, subjected to further separation, preferably by centrifuging, to recover a micro-organism fraction and a spent aqueous phase containing hydrocarbon impurities removed from the micro-organism. If necessary, the washing and separation steps may be repeated, once or more, using an aqueous surface active agent in the washing stage. After the washing with surface active agent it is necessary to wash with an aqueous medium which is free of surface active agent; preferably this medium will be water. Again if desired, a series of washing and separation stages may be employed. Overall the washing stages are carried out until the hydrocarbon content of the micro-organism is less than 7% based on the weight of the micro-organism (as calculated for the dry state). Preferably said content of hydrocarbons will be less 5%; usually the hydrocarbons will be substantially eliminated; however, for some applications this would not be necessary and in some cases therefore it would not be necessary to reduce said content to a value below 0.1%.

As the surface active agent employed for washing there may be used cationic surface active agents such as stearyltrimethyl ammonium chloride, non-ionic surface active agents, for example the condensates of oleic acid and ethylene oxide, or anionic surface active agents, for example sodium alkyl sulphates.

The micro-organism, after washing as hereinbefore described, is preferably recovered as a cream; preferably the cream contains 10–20% by wt., e.g. 15% by wt. of dry matter.

The micro-organism, preferably in the form of a cream, is subjected to treatment for the separation of proteins or polyproteins or polypeptides or amino-acids contained in the micro-organism from cell wall material.

The initial stage of the separation of the protein or polyprotein or polypeptides or amino-acids may be carried out by autolysis, plasmolysis or hydrolysis.

Autolysis may be effected by means of enzymes contained in the micro-organism or by the use of added enzymes. Usually pH will be maintained at a value determined by the nature of the enzymes used.

Preferably autolysis is carried out at a temperature in the range 45–55° C., preferably at 50° C.

The autolysate is usually obtained in the form of a liquid the viscosity of which depends upon the concentration of dry substances which is contains. As it is obtained without violent heating the amino-acids which are not very stable and the vitamins are preserved, usually completely.

Preferably when an autolysate is prepared for cattle feeding stuff a yeast is autolysed for three hours. Preferably this autolysate will contain 40–50% by wt. of dry matter.

Preferably when an autolysate is prepared for human consumption a yeast is autolysed for 10 to 20 hours. Preferably this autolysate will contain 55–65% by wt., preferably 60% by wt. of dry matter.

According to another aspect of this invention there are manufactured instead of autolysates, hydrolysates obtained by the action of acids or alkalies on the cells of micro-organisms or plasmolysates by the diffusion of the proteins out of the cells as a result of the action of a change in osmotic pressure. This change is achieved, for example, by the addition of sodium chloride to the aqueous medium. The operations of autolysis, hydrolysis and plasmolysis may be carried out in the same type of apparatus. Preferably this apparatus is a stirred vat.

It has been found that by reducing the hydrocarbon content of the micro-organism by washing as hereinbefore described, the rate of operation of the treatment for the rupture or extraction of the cell walls, for example, by autolysis, is increased; in consequence the residence time of the micro-organism in this stage will out-weigh the costs of the washing stages.

The product of this stage for the rupture of the cell walls is now treated for the separation of the nitrogenous materials, for example proteins and/or polyproteins and/or polypeptides and/or amino-acids from cell wall material.

This separation may be carried out by centrifuging and/or filtration. The nitrogenous fraction so obtained will contain as impurities hydrocarbons and usually, also, lipids. This fraction will preferably be subjected to solvent extraction. However if desired solvent extraction may be carried out prior to or without separation of the cell wall material.

Preferably solvent extraction is carried out by the use of a solvent consisting of or containing a hydrocarbon. Preferably the hydrocarbon has 4–7 carbon atoms per molecule. Preferably the hydrocarbon is a paraffin and preferably, the paraffin is a straight chain paraffin. Normal pentane and normal hexane are suitable solvents.

If desired the extraction of the hydrocarbons by means of a hydrocarbon solvent is preceded by extraction by means of an alcohol, preferably ethanol.

If desired there may be used an extraction stage using, as solvent, a mixture of a hydrocarbon, for example, as hereinbefore described together with an alcohol, for example ethanol. Thus there may be used a solvent consisting of 80% by wt. of hexane and 20% by wt. of ethanol.

The solution of hydrocarbons and lipids in solvent may be distilled to recover, separately, hydrocarbons and lipids.

The hydrocarbons recovered, if metabolisable, may be recycled to the micro-organism cultivation stage.

The lipids can further be treated for the recovery of sterols.

The autolysate recovered as raffinate may be dried as hereinbefore described, preferably at a temperature below 70° C. In the drying stage, traces of solvent will be eliminated from the autolysate.

The hydrocarbons recovered from the extract phase, if metabolisable, may be recycled to the micro-organism cultivation stage.

The fraction comprising the cell wall material, which will contain impurities, is then treated for the removal of these impurities as hereinbefore described.

40 litres of aqueous mineral nutrient medium, having the composition given hereinafter, was introduced into a stainless steel fermenter having an effective capacity of 60 litres.

The composition of the aqueous nutrient medium was as follows:

| | Grams |
|---|---|
| Diammonium phosphate | 2 |
| Potassium chloride | 1.15 |
| Magnesium sulphate, $7H_2O$ | 0.65 |
| Zinc sulphate | 0.17 |
| Manganese sulphate, $1H_2O$ | 0.045 |
| Ferrous sulphate, $7H_2O$ | 0.068 |
| Yeast extract | 0.025 |
| Tap water | 200 |
| Distilled water to 1000 ml. | |

20 litres of a 24 hour inoculum of *Candida lipolytica* on mixed $C_9$–$C_{16}$ normal hydrocarbons were then added, such that the cellular density was about 1 gm. of dry matter per litre.

15 grams/litre of heavy petroleum gas oil was introduced into the fermenter, that is 1.03 litres, which is enough to carry the cellular density to 2 grams/litre.

The temperature of the culture was held at 30° C±1° C., pH 4, the aeration and agitation were such that the rate of aeration was 3 millimoles of $O_2$ per litre of medium per minute.

10 N aqueous ammonia was introduced through an automatic pH controlling system. When the flow of ammonia reached 20 ml. the addition of the gas oil was started, at a rate determined by the theoretical needs of the culture and assuming a yield of $$\left(100 \times \frac{\text{yeast produced}}{\text{gas oil feedstock}}\right)$$

of 10% and a cellular division time of 3 hours. This addition was made every hour until the total amount of gas oil added reached 250 grams/litre, i.e. 17 litres.

This addition was continued up to and including the fifteenth hour.

Starting with a cellular density of grams/litre there was obtained a cellular density of 8 grams/litre at 15 hours.

A culture product so obtained was centrifuged and a yeast paste was recovered.

8.4 kilograms of this paste contained 2 kilograms of dry material (excluding retained hydrocarbons), 1 kilogram of non-metabolisable hydrocarbons and 1 kilogram of proteins; to this paste was added 14.5 litres of water containing 180 grams of sodium chloride.

The mixture was maintained at 50° C. for 10 hours under continuous slow agitation; without controlling the pH. The product so obtained contained about 600 grams of protein and 1200 grams of solubilised dry material.

This product was centrifuged in two stages in a Sharples centrifuge at 11,000 G to recover an oil phase containing cell wall material; a limpid liquid autolysate (containing 500 grams of protein) and a residue containing cell wall material, slightly impregnated with hydrocarbons.

The cell wall material recovered as residue was subjected to partial drying. After drying to a product containing 20% by wt. of water, this product was de-oiled by extraction at 55° C. by means of an azeotropic mixture of normal hexane and isopropanol at a ratio of 5 litres of solvent per kilogram of dry material in the product treated. The de-oiled material can be used as an animal foodstuff.

We claim:

1. A process which comprises cultivating a straight chain hydrocarbon consuming micro-organism selected from the group consisting of yeasts, bacteria of the orders Pseudomonadales, Eubacteriales and Actinomycetales; and *Penicillium expansum* in the presence of a feedstock consisting at least in part of straight chain hydrocarbons, thereafter subjecting the fraction comprising the micro-organisms and residual feedstock to cell-wall rupture and thereafter separating a fraction containing at least one nitrogen-containing compound selected from the group consisting of proteins, polyproteins, polypeptides and amino acids from a fraction containing cell-wall material which said cell-wall material having associated therewith at least part of the residual feedstock, and subjecting the cell wall material to solvent extraction so that the proportion of residual feedstock in the cell wall material is reduced.

2. A process according to claim 1 in which the method of rupturing the cell-walls is selected from the group consisting of autolysis, plasmolysis and hydrolysis.

3. A process according to claim 1 in which solvent extraction of the cell wall material is carried out by the use of a solvent containing a hydrocarbon.

4. A process according to claim 3 in which the paraffin is a straight chain paraffin.

5. A process according to claim 3 in which the extraction of the cell wall material by means of a hydrocarbon solvent is preceded by extraction by means of an alcohol.

6. A process according to claim 1 in which a fraction comprising cell wall material and the fraction containing at least one nitrogen-containing compound selected from the group comprising proteins, polyproteins, polypeptides and amino acids, derived from the micro-organism is subjected to solvent extraction.

7. A process according to claim 6 in which solvent extraction is carried out by means of a solvent containing a hydrocarbon.

8. A process according to claim 1 in which the micro-organism is a yeast.

9. A process according to claim 8 in which the yeast is of the family Cryptococcaceae.

10. A process according to claim 9 in which the yeast is of the genus Candida.

11. A proces according to claim 10 in which the yeast is *Candida lipolytica*.

12. A process according to claim 1 in which the feedstock is a petroleum fraction.

13. A process which comprises cultivating micro-organisms selected from the group consisting of yeast, bacteria of the orders of Pseudomonadales, Eubacteriales, Actinomycetales and *Penicillium expansum* in the presence of a feedstock consisting at least in part of straight chain hydrocarbons, separating from the resulting product a fraction containing the micro-organisms and residual hydrocarbon feedstock, reducing the proportion of residual hydrocarbon feedstock in the fraction to a hydrocarbon content less than 7% by weight, and thereafter subjecting the resulting fraction to conditions such that rupture of cells of micro-organisms of the fraction takes place.

14. A process according to claim 13 wherein the method of reducing the proportion of residual feedstock is by means of a series of alternate washings and separation stages, in the first washing stage there being used an aqueous solution of a surface active agent and in the last washing stage there being used an aqueous medium which is free of surface active agents, the separation stages being operated to separate the micro-organism from the aqueous phase.

15. A process according to claim 13 in which the method of rupturing the cell walls is selected from the group consisting of autolysis, plasmolysis and hydrolysis.

16. A process according to claim 13 wherein subsequent to the rupture of the micro-organism cells there is separated a fraction containing at least one nitrogen containing compound selected from the group consisting of proteins, polyproteins, polypeptides and amino acids contained in the micro-organisms or is derived therefrom.

17. A process according to claim 13 in which the micro-organism is a yeast.

18. A process according to claim 17 in which the yeast is of the family Cryptococcaceae.

19. A process according to claim 18 in which the yeast is of the genus Torulopsis.

20. A process according to claim 18 in which the yeast is of the genus Candida.

21. A process according to claim 20 in which the yeast is *Candida lipolytica*.

22. A process according to claim 13 in which the micro-organism is a bacterium.

23. A process according to claim 13 in which the feedstock is a petroleum fraction.

24. A process according to claim 13 wherein subsequent to the rupture of the micro-organism cells there is separated a fraction containing at least one nitrogen containing compound selected from the group consisting of proteins, polyproteins, polypeptides and amino acids from a fraction containing cell wall material which said cell wall material having associated therewith at least part of the residual feedstock.

25. A process according to claim 13 in which the cell wall material, which contains at least part of the residual feedstock, is subjected to solvent extraction so that the proportion of residual feedstock in said cell wall material is reduced.

References Cited by the Examiner

UNITED STATES PATENTS

| | | | |
|---|---|---|---|
| 2,319,831 | 5/1943 | Torrington | 99—96 |
| 2,697,061 | 12/1954 | Harris et al. | 195—1 |
| 2,764,487 | 9/1956 | Wickeham et al. | 99—96 |

OTHER REFERENCES

Cook: The Chemistry and Biology of Yeasts, Academic Press Inc., New York, 1958, pp. 167–172.

A. LOUIS MONACELL, *Primary Examiner.*

D. M. STEPHENS, *Assistant Examiner.*